F. L. NICHOLS.
MACHINE FOR MAKING COVER OR CLOSING DISKS.
APPLICATION FILED MAR. 15, 1907.

927,002.

Patented July 6, 1909.

6 SHEETS—SHEET 1.

Witnesses
Jm Innie
E. R. Peck

Inventor
Frank L. Nichols
By Hubert E. Peck
Attorney

F. L. NICHOLS.
MACHINE FOR MAKING COVER OR CLOSING DISKS.
APPLICATION FILED MAR. 15, 1907.

927,002.

Patented July 6, 1909.
6 SHEETS—SHEET 2.

Witnesses
J. H. Imrie
E. R. Peek

Inventor
Frank L. Nichols
By Kirkut & Peck
Attorney

F. L. NICHOLS.
MACHINE FOR MAKING COVER OR CLOSING DISKS.
APPLICATION FILED MAR. 15, 1907.
927,002.
Patented July 6, 1909.
6 SHEETS—SHEET 3.
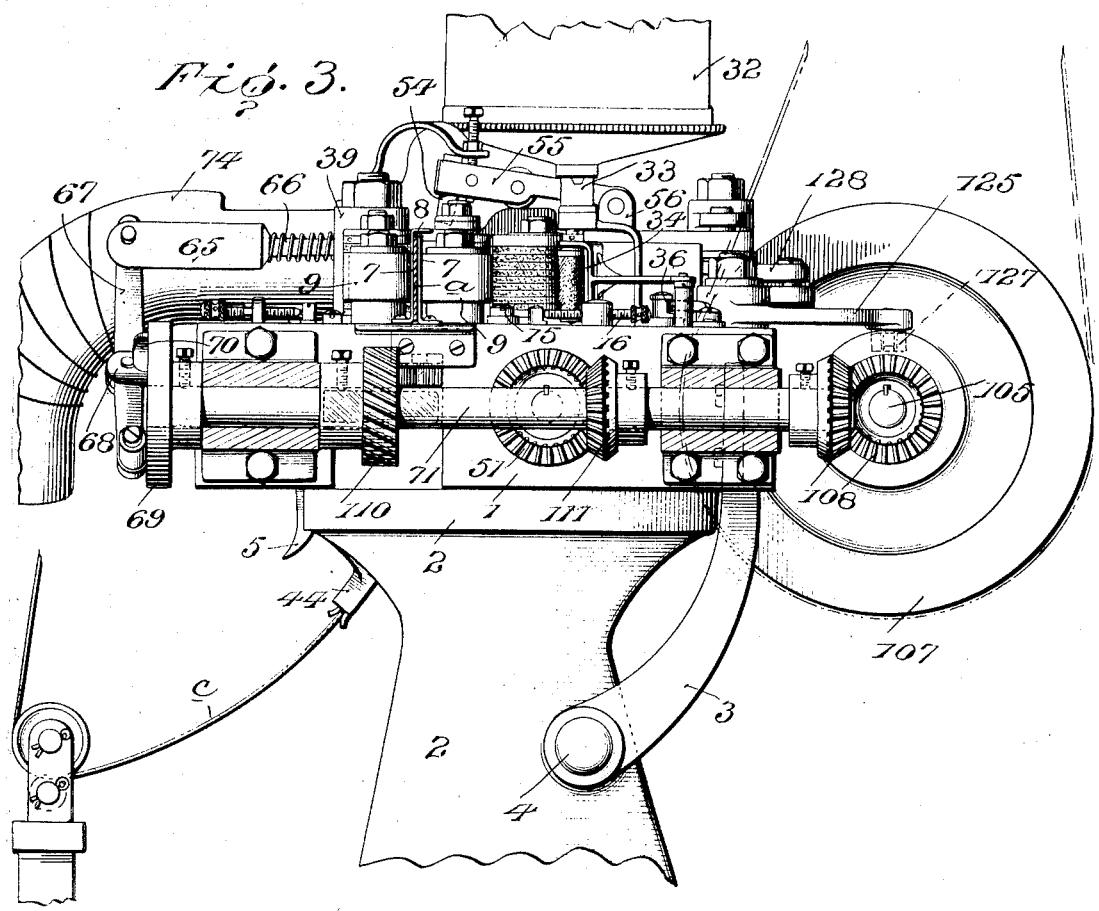
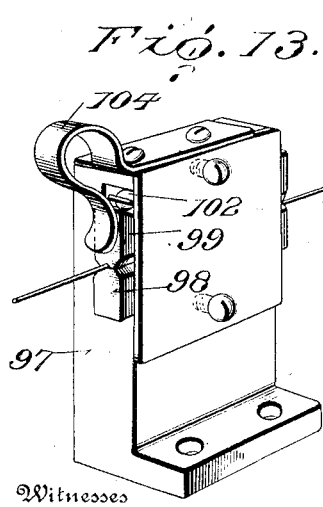
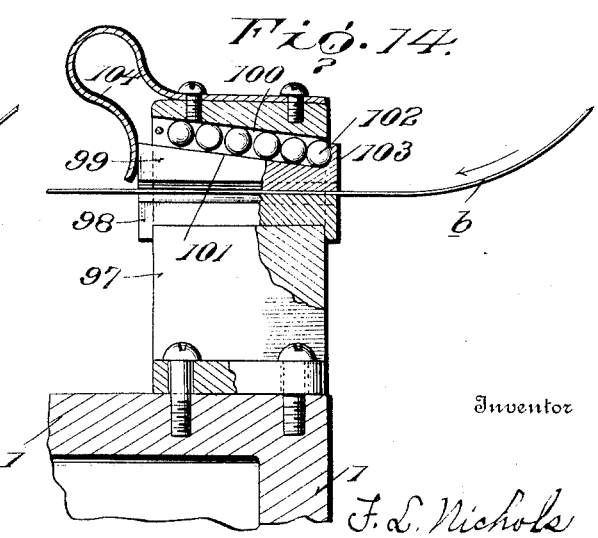

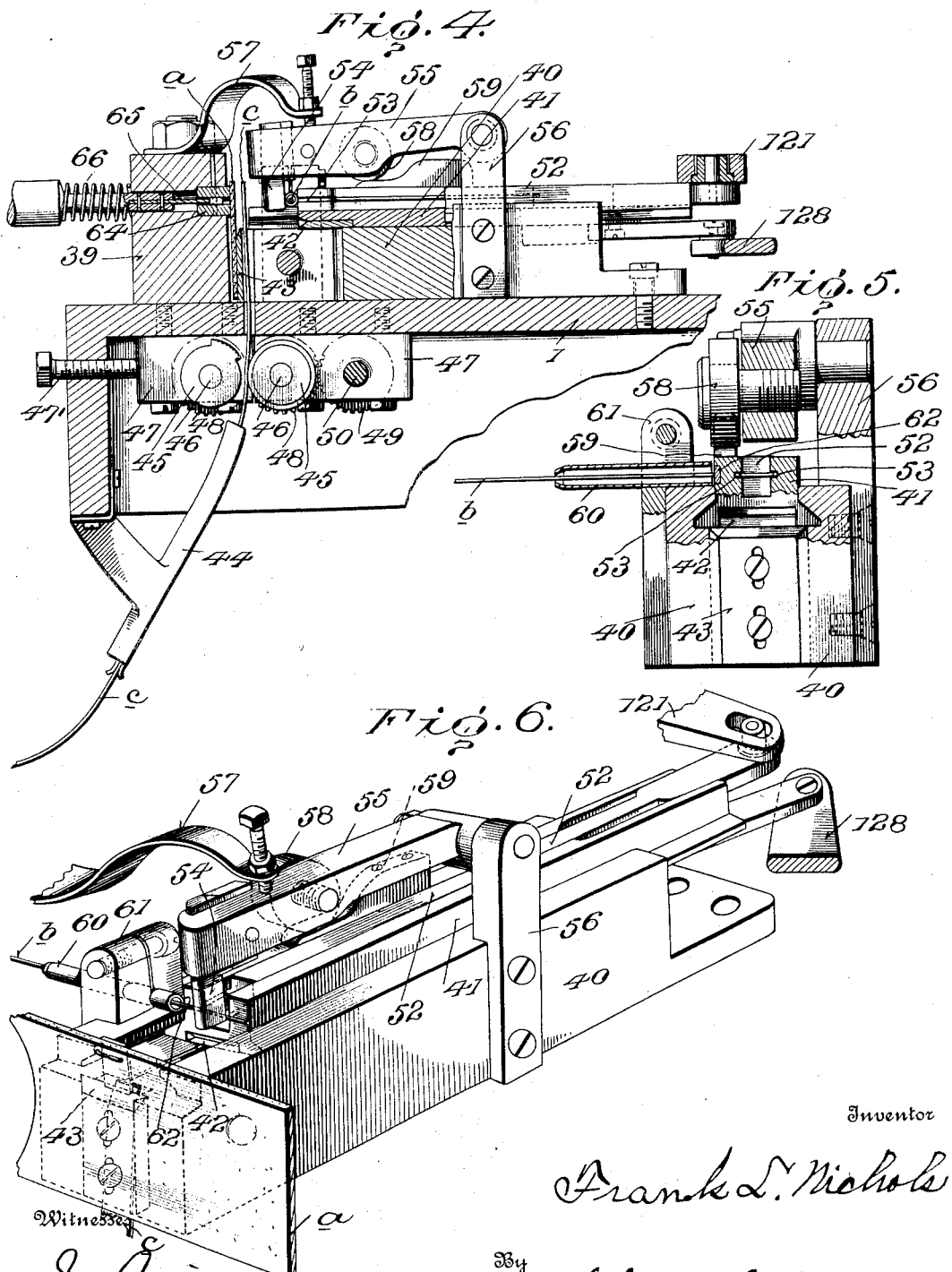

F. L. NICHOLS.
MACHINE FOR MAKING COVER OR CLOSING DISKS.
APPLICATION FILED MAR. 15, 1907.
927,002.
Patented July 6, 1909.
6 SHEETS—SHEET 5.
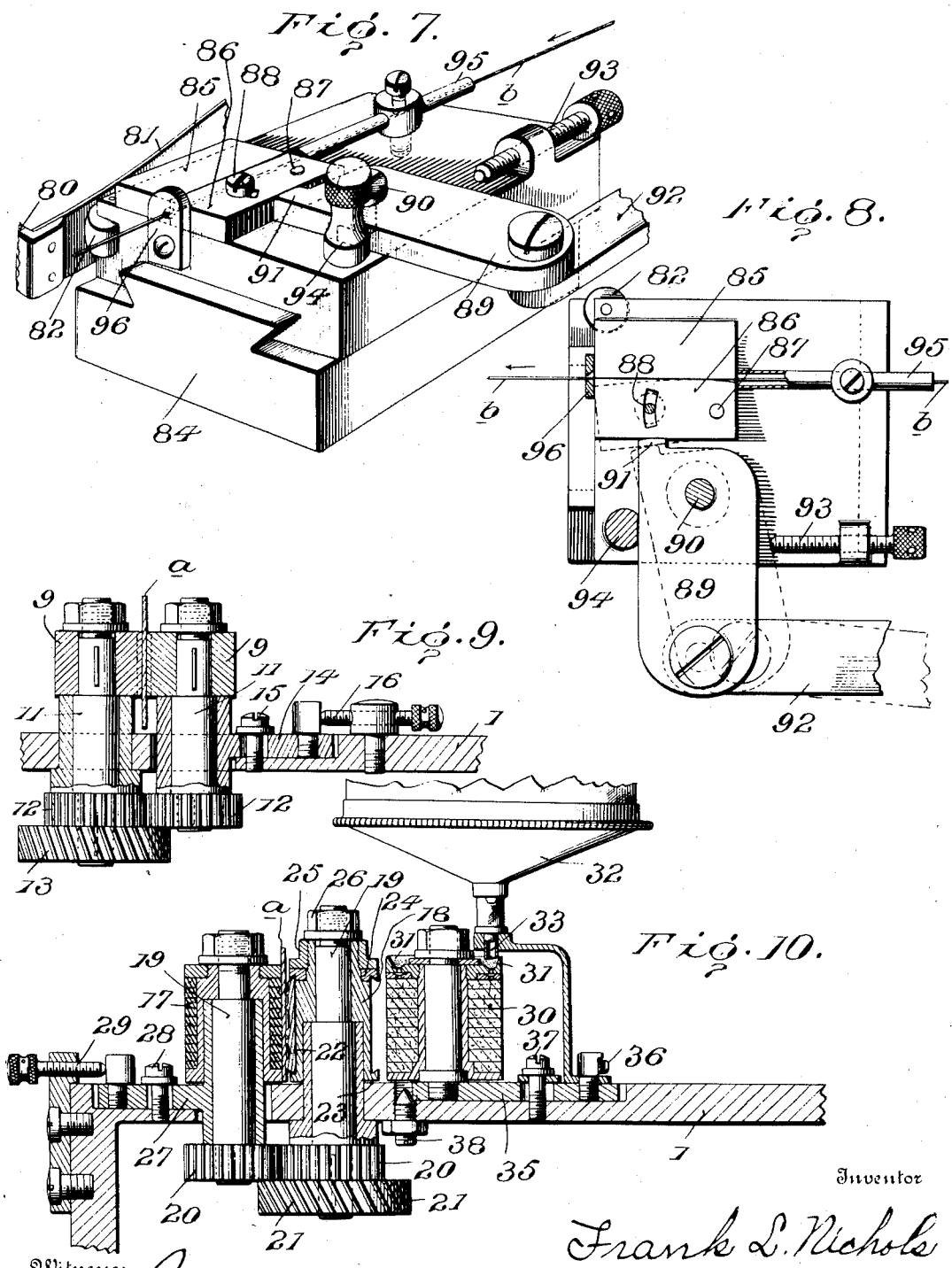
Witnesses
E. R. Peek
Inventor
Frank L. Nichols
By
Hubert Pick
Attorney

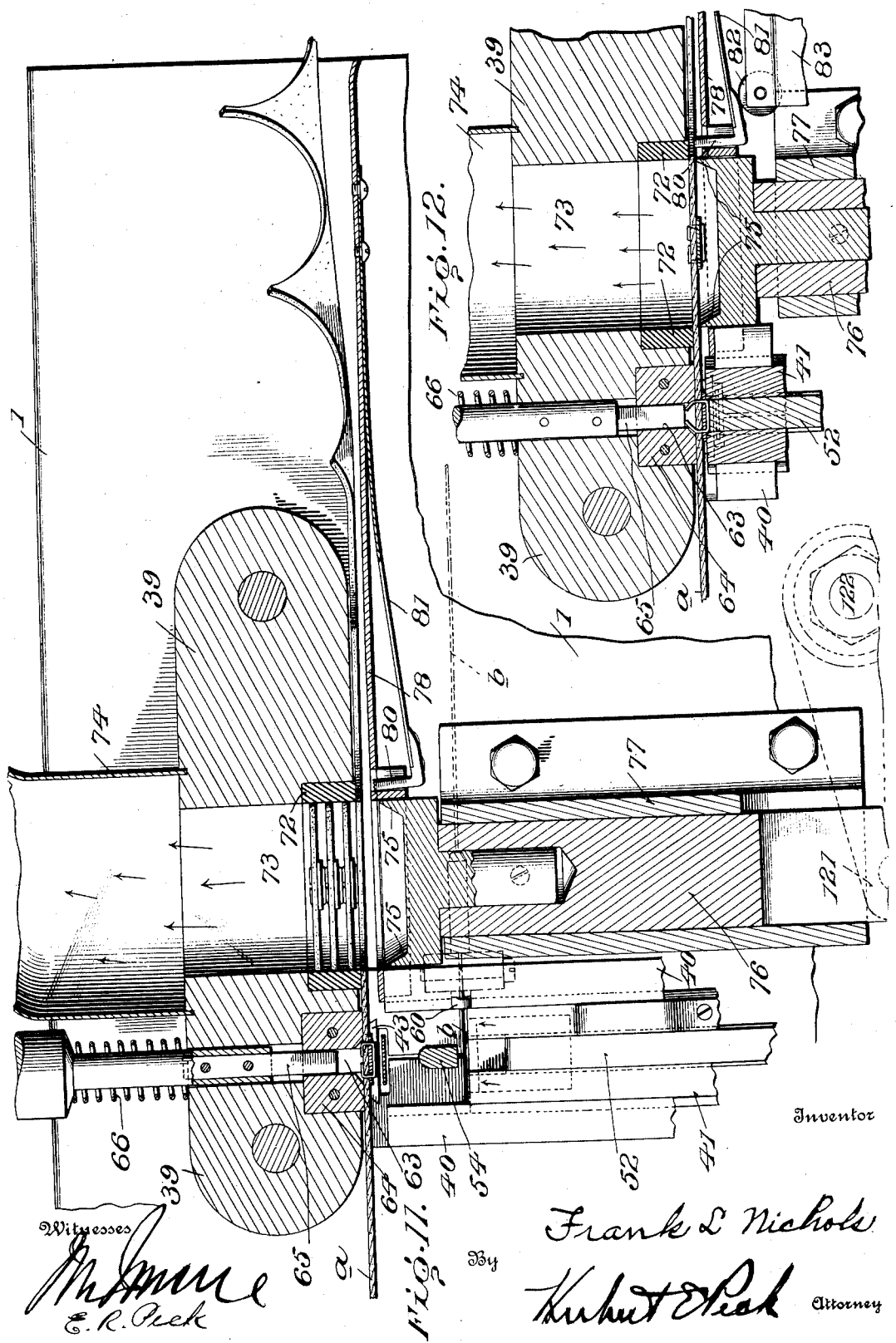

UNITED STATES PATENT OFFICE.

FRANK L. NICHOLS, OF WASHINGTON, DISTRICT OF COLUMBIA, ASSIGNOR TO THE AMERICAN DAIRY SUPPLY COMPANY, OF AUGUSTA, MAINE, A CORPORATION OF MAINE.

MACHINE FOR MAKING COVER OR CLOSING DISKS.

No. 927,002.   Specification of Letters Patent.   Patented July 6, 1909.

Application filed March 15, 1907. Serial No. 362,513.

*To all whom it may concern:*

Be it known that I, FRANK L. NICHOLS, a citizen of the United States, residing at Washington, District of Columbia, have invented certain new and useful Improvements in Machines for Making Cover or Closing Disks; and I do hereby declare the following to be a full, clear, and exact description of the invention, such as will enable others skilled in the art to which it appertains to make and use the same.

This invention relates to certain improvements in machines for making receptacle closing disks or caps, and the objects and nature of my invention will be readily understood by those skilled in the art in the light of the following explanation of what I now consider my preferred embodiment, shown in the accompanying drawings, from among other structures and arrangements within the spirit and scope of my invention.

An object of the invention is to provide mechanism for the rapid, accurate and economical manufacture of disks or caps having handles or pull tabs clipped thereto and adapted for use in closing milk jars or other receptacles.

A further object of the invention is to provide comparatively simple and effective mechanism for rapidly and accurately forming disks, from paper stock or the like, having handles applied thereto, and if desired whereby each disk can be imprinted.

A further object of the invention is to provide stock feeding and cutting mechanisms with staple forming and driving mechanisms operating in proper sequence to form receptacle closing disks having flexible handles clipped thereto.

The invention consists in certain novel features of construction and in combinations and arrangements of parts as more fully and particularly set forth hereinafter.

Figure 1:
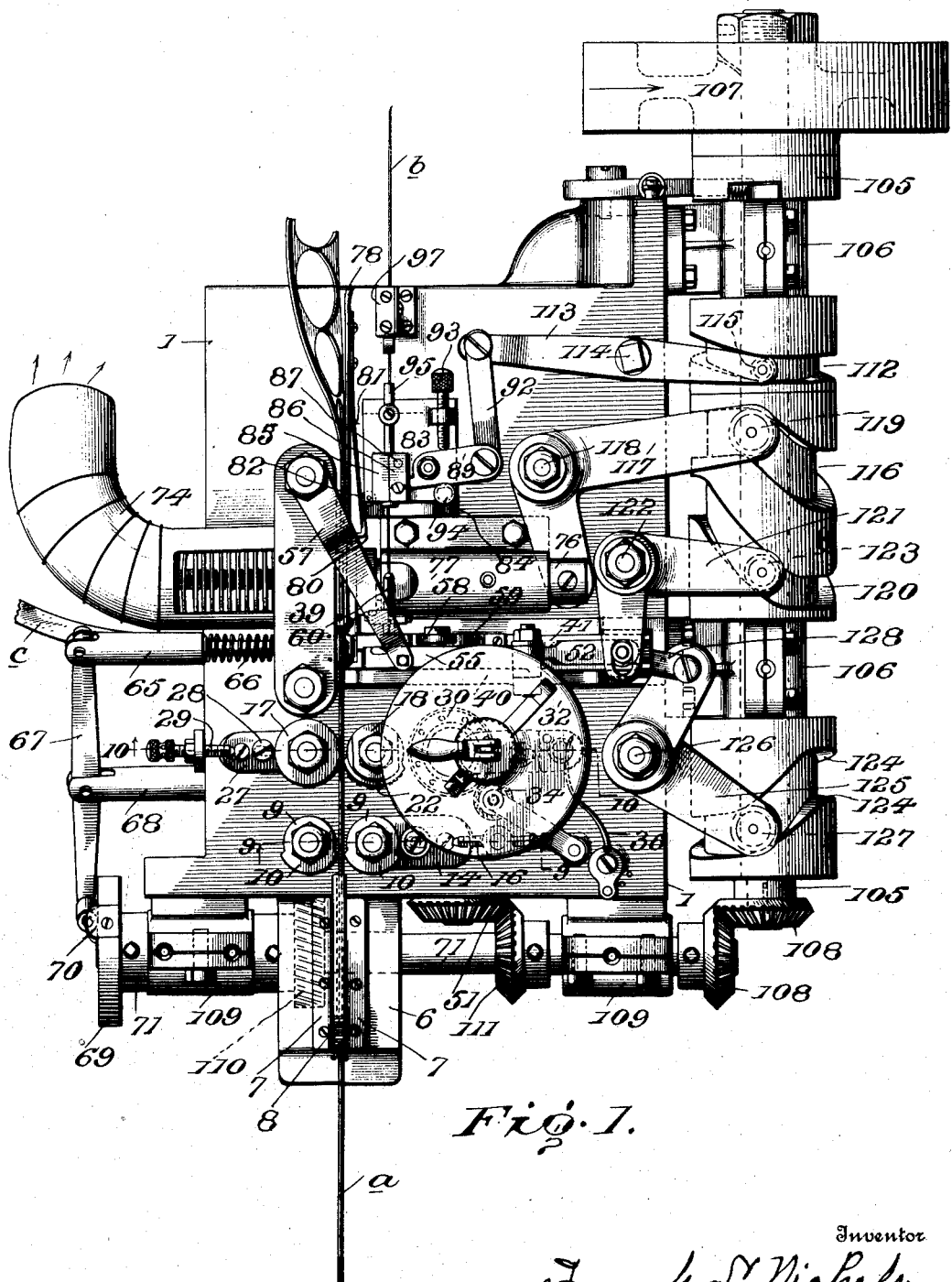
Figure 2:
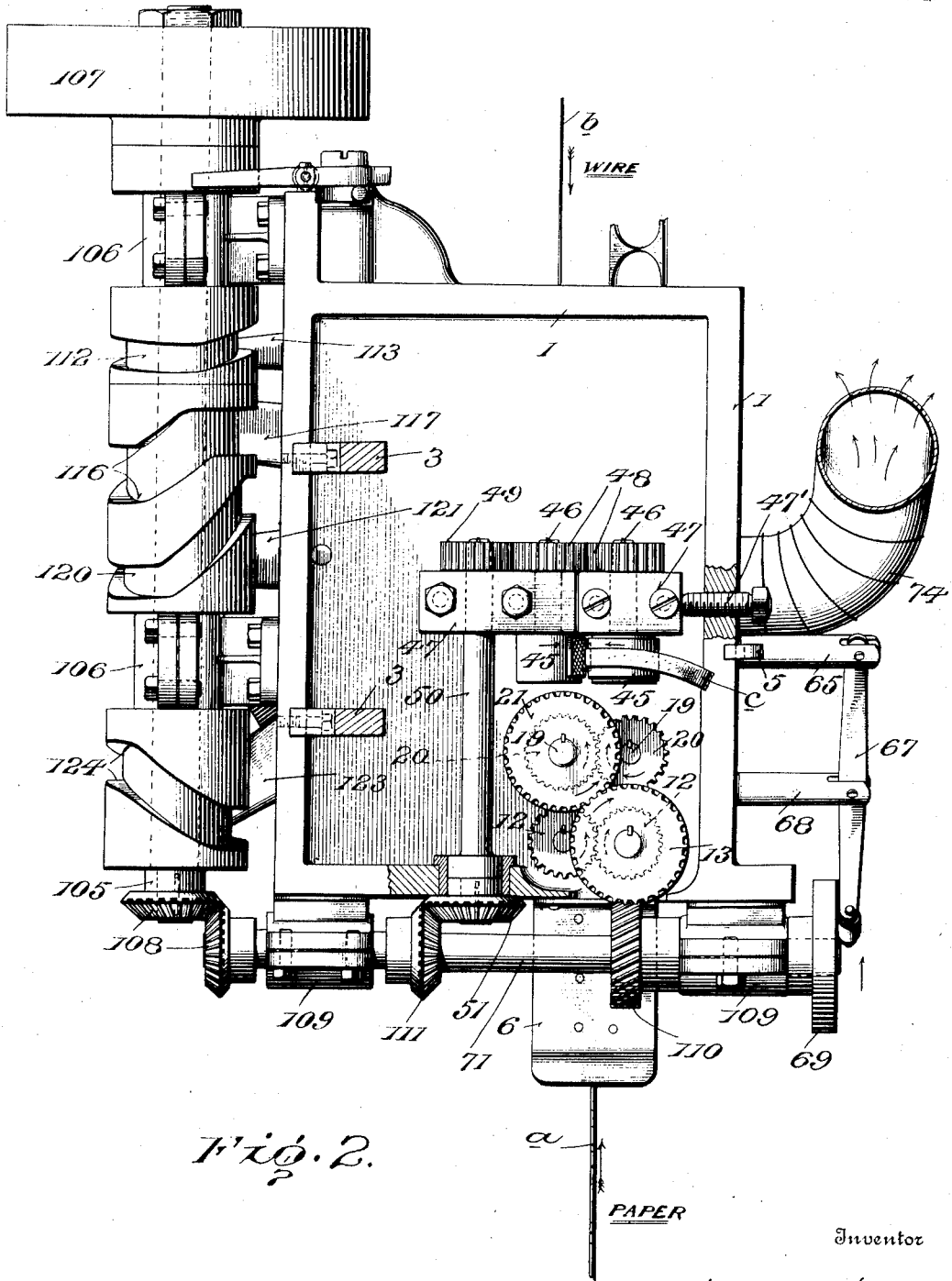

Referring to the accompanying drawings:—Figure 1, is a top plan view of the machine. Fig. 2, is a bottom plan of the bed or table of the machine, certain parts being broken away. Fig. 3, is an end view of the machine, a portion of the pedestal being shown, some parts being broken away, and the paper stock for the disks being shown in section. Fig. 4, is a vertical cross sectional view through the machine in the plane of the stapling mechanism, showing the parts in normal position, that is, in position to permit a length of wire to be fed into the mechanism preparatory to cutting off a length thereof and forming a staple therefrom. Fig. 5, is a detail vertical section through a portion of the staple forming mechanism, said section being taken in the plane of the wire feed, and at right angles to the plane of the section of Fig. 4. Fig. 6, is a detail perspective view of the staple forming mechanism, the parts being shown in the same positions as in Fig. 4. Fig. 7, is a detail perspective view of the wire feed mechanism, the parts being shown in positions assumed in the act of feeding a length of wire into the stapling mechanism. Fig. 8, is a plan view of the wire feed, dotted lines showing different positions of certain parts. Fig. 9, is a detail vertical cross section taken in the plane of the line 9—9, Fig. 1. Fig. 10, is a detail vertical cross section taken in the plane of the line 10—10, Fig. 1. Fig. 11, is a detail horizontal section showing the staple forming and driving mechanisms in the positions assumed after forming, driving and clenching a staple, the staple being shown clenching a handle to the disk stock, the disk cutter die or punch being shown in its normal position, that is at its limit of return stroke having just cut one of the disks shown in the discharge chute and completed its return stroke. Fig. 12, is a corresponding horizontal section, the stapling mechanism being shown in the act of clenching a staple, and the disk cutter or die being shown on its forward stroke and in the act of cutting a disk and feeding the same forward in the disk discharge chute. Fig. 13 is a detail perspective of the wire tension and straightening device. Fig. 14, is a sectional elevation thereof.

The particular form of cap or closing disk produced by the machine disclosed, as an example of mechanism within the spirit and scope of my invention, consists of a flat round stiff paper, card, wood or pulp board, or other suitable material disk having a narrow paper tab or handle near one end, clipped to the disk and resting flat against and parallel with a face thereof, although as at present advised I do not wish to so limit my invention.

The apparatus of the specific example illustrated, is adapted to feed, with a step by step movement, a ribbon or band of the paper stock to form the disks, to imprint this ribbon at uniformly spaced intervals, to feed a narrow band of flexible paper or other suitable material with a step by step movement, transversely across a face of said stock ribbon, and to cut off suitable lengths of said band and staple or clip the same to said ribbon at uniformly spaced intervals, and then to cut the disks from said ribbon, each having a handle or tab clipped thereto, and being usually imprinted with advertising matter or any suitable legend or other matter. The specific apparatus illustrated, is also adapted to intermittingly or periodically feed enough wire to form a clip or staple, and then to form a staple therefrom, drive the staple through the handle or tab stock and through the disk stock, clench the staple, and cut off sufficient tab or handle stock to form the handle clipped to the disk stock.
As at present advised, I do not wish to limit my invention to all the features thus described, as I believe that I am the first to produce apparatus to make receptacle closing disks with handles or tabs clipped or otherwise secured thereto.

In the accompanying drawings, I show the working parts of the apparatus, carried by a horizontally arranged bed plate or frame 1, resting on the upper end of a pedestal 2.
This bed can be arranged or mounted on the pedestal or other support, in any suitable manner or by any suitable means, although in the specific example illustrated, I show the bed 1, detachably resting on the pedestal, preferably hinged thereto to swing up therefrom so that the gearing or other parts arranged beneath the bed, can be easily and quickly examined or adjusted. For instance, arms 3, can be secured to one edge portion of the bed and depend therefrom with their lower ends pivotally joined by horizontal pivots 4, to the pedestal, so that the bed can swing up and down to rest against the side of the pedestal in a reversed position, permitting ready and quick access to the gearing and other parts carried by and arranged at the bottom of the bed. The edge or end portion of the bed, opposite the hinge arms 3, can be provided with any suitable means to detachably lock or hold the free end of the bed down to or on the pedestal. For instance, I show a depending spring catch 5, adapted for this purpose.

In the specific example illustrated, the ribbon of disk stock $a$, is moved along the top face of the bed from one end thereof, while the wire $b$, for the stapling mechanism is fed above the top of the bed from the opposite end thereof, and the band of handle or tab stock $c$, is fed upwardly below the bed and through an intermediate portion thereof, to intersect the path of movement of the stapling mechanism. The wire and disk and handle stock are carried by and fed from suitable spools or reels, not shown, and the disk stock passes horizontally along the table arranged vertically or on edge, while the tab or handle stock passes vertically up through the bed at right angles to the line of feed of the disk stock. The disk stock passes onto the bed through a suitable straightening and tension device (Figs. 1 and 3) extending vertically from a guide plate or bracket 6, secured to and projecting horizontally from the end edge of the bed, and the tension device consists of a pair of vertically disposed approximately parallel spring plates 7, secured to the bracket 6 and tending to spring together. The disk stock passes between these plates which spring and press against the stock and thereby exert their tension thereon requiring the exertion of a certain degree of pulling force on the stock to overcome the friction of said plates and draw the stock through the tension device. One of the plates can have its upper edge formed with a longitudinal horizontal flange 8, extending over the top edge of the other plate and thereby forming a guard confining the stock against upward movement from between the plates.

A suitable feed device is provided to pull the disk stock through the tension device and move the same along the top face of the bed, and this feed device is preferably arranged to move the stock step by step or intermittingly. For instance, I show a pair of vertically disposed horizontally rotating coöperating feed rolls 9, arranged above the bed and provided with mutilated or interrupted projecting biting or frictional feeding surfaces 10, so arranged that the disk stock will, at each revolution of said rolls, be fed forward a distance approximately equal to the diameter of each disk to be cut from the stock. Each feed roll is carried by a vertical spindle 11, extending below the bed, where the spindles carry meshing gears 12, by means of which the two rolls positively rotate in unison. One spindle 11, also carries driving gear 13, actuated as hereinafter described. One spindle 11 is suitably mounted usually by a fixed bearing in the bed, while the other spindle can be mounted in and carried by an adjustable slide 14, extending into a slot in the bed and adjustable transversely of the line of feed of the disk stock to vary the distance between the feed rolls to maintain the proper relative position between said rolls and the stock. Means, such as clamping and set screws 15, 16, can be provided for adjusting and clamping said slide in the desired adjustment.

If so desired mechanism can be provided to imprint each disk, and where the disks are to be imprinted I prefer to imprint the disk stock before the disks are cut therefrom so that each disk will be cut from portions of the stock previously imprinted. As a convenient means for this purpose, I show printing mechanism comprising a pair of coöperating vertical rotary members consisting of an impression roll 17, and a printing roll 18, arranged over the bed, and alined with the feed rolls to receive the disk stock therefrom. These rotary members of the printing mechanism are mounted on vertical spindles 19, extending below the bed and there provided with meshing gears 20, whereby the two members are positively driven in opposite directions. One of the spindles also carries the gear 21, meshing with feed roll driving gear 13, by which the printing mechanism is actuated (see Figs. 2–10). The printing roll is usually mounted in a fixed bearing extending through the bed, and said roll is provided with any suitable printing characters or the like, although I preferably employ a projecting printing die 22, removably secured to the roll by any suitable means, so that the die can be removed when desired to change the printing face or characters. The printing roll is preferably so reduced or otherwise formed that the only portion thereof to have feeding engagement with the disk stock, will be the printing die, thereby avoiding liability of smearing ink on the stock and also preventing the stock being fed forward when the feed rolls are not acting thereon. The printing roll is so timed through the medium of the gearing hereinbefore referred to, as to bring its printing die into operative engagement with the stock, as the stock feeding surfaces of the feed rolls are acting on the stock so that the printing and impression rolls have a feeding action on the stock, if at all, only while the feed rolls are performing their feeding stroke on the stock. The printing roll is also timed and arranged to imprint the stock at equally spaced intervals so spaced that the imprints will always coincide with the portions of stock afterward cut out to form the disks.

Suitable means can be provided to removably lock the curved segmental printing die or plate 22, to the printing roll or permit removal thereof if printing is not desired on the disks. For instance, I show the roll formed with a lower end projecting annular flange 23, having an undercut top face to receive the lower edge of the die. A removable top ring 24, is provided having an undercut lower face to receive the top edge of the die and this movable top ring can be held down to clamp the die between flange 23 and ring 24, by a nut 25.

26, is a nut screwing on the spindle and locking the printing roll thereto.

The impression roll spindle can be mounted in and extend through an adjustable slide 27 confined to permit adjustment of the slide to carry the impression roll toward and from the printing roll. The clamping screw 28, is provided to lock the slide in the desired adjustment, and the set screw 29, is employed to accurately adjust the slide. An inking roll 30, is provided to contact with and supply ink to the surface of the printing die. This inking roll can be of any suitable construction, although I show a roll formed of disks of absorbent material clamped between end heads. The upper or top end head 31, being formed with an annular ink distributing trough having bottom openings to the upper end of the absorbent material.

32, is an ink font or reservoir suitably supported above the ink roll and having a depending ink discharge or drop tube or nozzle 33, arranged to feed the ink drop by drop, or otherwise as desired, into the trough or head 31, from which the ink passes into and is absorbed by the absorbent material.

If desired a distributing roll 34 can be employed, see dotted lines Fig. 1, bearing against the absorbent material face of the inking roll. I show the inking roll and font carried by an adjustable slide 35, by which the inking roll can be moved toward and from the printing roll. A spring 36, is shown yieldingly pressing said slide toward the printing roll, and a clamping screw 37, is provided to clamp the slide in position if desired, or to hold the slide against upward movement while permitting sliding movement thereof.

The limit of movement of the slide toward the printing roll is regulated by adjusting screw 38, having a tapered or beveled end engaging the front edge of the slide. When the adjusting screw 38, is moved up, its tapered edge will force the slide in a direction away from the printing roll, while movement of the screw in opposite direction permits movement of the slide toward the printing roll, as will be readily understood by those skilled in the art by reference particularly to Figs. 1 and 10. While I have disclosed printing mechanism included in the machine illustrated, yet I do not wish to limit the broad features of my invention to use in connection with printing mechanism, and while I have disclosed printing mechanism involving features of material advantage and utility, yet where printing mechanism is employed, I do not wish to limit myself to the mechanism disclosed, as printing means of any suitable or desirable construction can be employed.

From the printing mechanism, the ribbon of disk stock, is pushed in a straight line or path along the top face of the bed to be acted on by the tab or handle applying mechanism and by the disk cutter or former. The disk stock passes, from the printing mechanism, along the inner longitudinal face of a block or wall 39, rigidly secured on and rising from the bed and forming a guide or platen for the disk stock during the tab applying and disk cutting operations.

A narrow guide or passage way, preferably alined with and immediately behind (in the direction of movement of the stock) the bite of the printing members, is formed to receive and guide the stock as it leaves the printing mechanism and moves to the tab or handle receiving station or point. This guide way is formed by the vertical inner face of the block or wall 39, and by the inner end of the frame or block 40, of the stapling mechanism which frame terminates a short distance from the inner face of the block 39. The frame 40, is secured horizontally on the bed and is arranged at right angles to the line of feed of the disk stock; the disk stock moving transversely across the front end of said frame 40.

The block or frame 40, is formed with a longitudinal undercut slideway throughout the length of its top and opening through the front end thereof opposite the upper portion of the vertical inner side face of the disk stock. The wire and tab or handle cutting and staple forming and driving means are carried by said block and comprise the longitudinal slide 41, reciprocating and confined in said slideway, and at the lower portion of its front end provided with a horizontal or transverse handle stock cutting blade 42, adapted to coöperate with the top transverse cutting edge of the vertical blade 43 (Figs. 4, 5 and 6) secured at the front end of frame 40, and across the inner face of which the disk stock moves. A vertical passage way for the narrow flexible paper handle or tab stock $c$, is formed through the bed and frame 40, at the rear or outer face of the blade 43, see Fig. 4.

The tab stock passes upwardly beneath the bed and is drawn through a vertically disposed tension and straightening device 44, carried by a bracket secured to the depending apron of the bed and having its upper end beneath the opening in the bed. This tension device 44, is usually formed of a pair of spring plates pressing toward each other and between which the stock is drawn; the construction of the tension device 44, being if desired practically the same as the construction of the tension device for the disk stock, hereinbefore described. Any suitable interrupted or intermittent feed is provided to periodically project the necessary length of tab stock through the vertical passage behind the knife 43, and projecting vertically above the same at the face of the disk. As means which can be provided for this purpose, I show a pair of horizontal positively driven feed rolls 45, arranged just beneath the bed and at the upper end of the tension device 44. These rolls 45, are arranged, at each revolution, to move the tab stock a certain distance upwardly, and then allow said stock to remain at rest for a certain length of time or in proper sequence with the disk stock feed and the stapling and disk cutting operations. The tab stock feed rolls can be constructed the same as the disk stock feed rolls with a mutilated or interrupted feeding surface, whereby the rolls can constantly rotate and yet feed the stock only at stated intervals and a fixed distance at each feeding stroke. The tab stock feed rolls are carried by suitable shafts 46, journaled in boxes 47, secured to the under side of the bed, and geared together to positively rotate in unison by gears 48, and the feed roll shafts can be driven by gear 49, on the end of horizontal shaft 50, having bevel gear 51, at its outer end beyond an edge of the bed. One of the journal boxes 47 can be adjustable toward and from the other box by set screw 47'.

The slide 41 of the stapling mechanism is formed throughout its length, with a top longitudinal slideway, in which the staple driving hammer or slide 52, is arranged to reciprocate. This hammer 52, is normally withdrawn to its limit of rearward movement, as shown in Figs. 4, and 6, with its front end arranged a distance rearwardly beyond the front end of the slide 41, and thereby leaving the staple forming socket at the front end of slide 41, and formed by the front portion of the slide-way in which the hammer works. The inner faces of the vertical side walls of this socket are shown formed with horizontal or longitudinal grooves 53, (Fig. 5, dotted lines Fig. 6) to receive the legs of the staple formed in the socket.

An anvil or former 54, is provided on which the staple is formed or bent, by the slide 41. This former consists of a vertically disposed block of a width to enter the staple receiving socket in the front end of slide 41, and is of such shape that the slide 41 can bend the wire thereon to produce staples of the desired form and size.

Means are provided to withdraw the former from operative position and from the slide as the slide moves forward on the completion of the operation of forming each staple. As a suitable means for accomplishing this result, I show the former fixed to and depending from the free end of a vertically swinging lever 55, arranged above the slide 41, and at its rear end mounted on a horizontal pivot carried by rigid vertical post 56, from the block or frame 40. A spring 57, is provided bearing down on the free end of lever 55, and tending to hold the same down with the former in operative position. The position of the lever is determined by suitable stop means, such as a roller 58, carried by and arranged beside the lever and usually mounted on a stud or pin projecting horizontally therefrom. This roller rides on a cam surface 59, arranged longitudinally on the top edge of the slide 41. This cam is so arranged that when the slide 41, is in its normal position, that is, at its return stroke limit, as in Fig. 4, the roller is located on the lowest portion of the cam and consequently the lever under its spring pressure is in its lowest position with the former in operative position arranged a short distance in advance of the front end of the slide 41, and in line with the front end of the slideway or staple receiving socket thereof. These parts remain at rest in this position, while the disk and tab stocks are being each moved a feed stroke, and while the wire feed is performing a feed stroke. The wire b, from which the staples are formed, is fed transversely of the slide 41, through a horizontal guide tube 60, carried by a bracket 61, projecting upwardly from the front portion of the block or frame 40, beside the slide 41. At each feeding stroke of the wire feed device, a certain straight length of wire is projected transversely across the front end of the slide 41, and behind the rear edge of the former 54, bridging the open front end of the slideway or staple receiving socket of the slideway, (see Fig. 6). On the completion of this wire feed stroke, the slide 41, starts on its operative stroke toward the former 54, and toward the disk stock. The vertical side edge 62, of the slide 41, forms a cutting edge which shears off the length of wire at the end of the tube 60, and the severed length of wire at its central portion is gripped between the rear edge of the former and the front edges of the slide 41 and as the slide continues to advance beside the stationary former, the ends of the wire length are bent forwardly against the flat side faces of the former and are pressed into the grooves 53, until the staple is completely formed with its cross end portion resting between the rear edge of the former and the front end of hammer 52, and its parallel forwardly projecting legs resting in the grooves 53, and across the side faces of the former now located in the socket in the front end of the slide 41. By the time the slide 41, has reached its limit of forward movement and the completion of its operative stroke, the lever roller 58, has ridden up on the highest portion of the cam 59, lifting the lever 55, against the tension of the spring and raising the former clear of the staple and slide 41.

Just before the slide 41, reaches its limit of forward stroke, its front end engages the upwardly projecting end of the tab stock and presses the same against the face of the disk stock and the knife edge 42, coöperates with the edge of knife 43 in shearing off the length of tab stock to form the handle or tab, and the hammer 52, moves forward and drives the staple through the upper end portion of the severed length of tab stock and through the upper portion of the disk stock. The staple legs passing through the disk stock engage the inclined walls of a horizontal aperture or opening 63, in a die or platen 64, secured in the block 39 and are thereby deflected toward each other in readiness to be clenched or tightly driven down against the rear face of the disk stock, see Fig. 12.

As soon as the staple has been driven completely through the disk stock, a clenching tool or plunger 65, moves forwardly through opening 63 in block 39, and die 64, and tightly clenches the staple legs against the disk stock while the hammer 52, is pressing against the staple and tab in the opposite direction so that the tab, staple and disk stock are compressed between the hammer and clenching plunger. As soon as the staple is thus clenched, the clenching plunger moves outwardly on its return stroke, and the slide 41 and hammer move inwardly on their return strokes. In the specific example illustrated, the clenching plunger 65, is actuated on its return stroke by a coiled spring 66, and is driven on its operative stroke by a lever 67, intermediate its ends fulcrumed on a post 68 projecting horizontally from the machine bed. One end of the lever is pivotally joined to the outer end of the clencher plunger while the opposite end of the lever is provided with a roller yieldingly held by spring 66, against the outer vertical face of a constantly rotating disk 69, having a cam projection 70, to engage said roller and rock the lever to actuate the clenching plunger on its operative stroke in proper sequence with the movements of the staple driving mechanism. The disk 69 is carried by the outer end of a shaft 71, to be more fully described hereinafter.

At each step or movement of the disk stock, the portion of stock to which a tab or handle was applied after the previous step or movement, is moved to the disk cutting position or station, which is arranged immediately beyond the tab applying position. In the specific example illustrated, the disk cutting mechanism comprises male and female dies or cutters. The female ring or annular die 72, is inserted in the block or wall 39, and a horizontal discharge opening 73 is formed transversely through said block in outward continuation of the die opening. If so desired, a disk discharge pipe or chute 74, can be attached to the block 39, or otherwise supported to receive the disks from opening or passage 73, and convey the same to desired point for packing or otherwise.

75, is the reciprocating punch or cutter which coöperates with the die 72 in cutting the disks from the stock. This punch is formed with an annular projecting cutting edge and is carried by a horizontal reciprocating stock 76, arranged transversely of the line of feed of the stock and reciprocating in a slideway or housing 77, secured on the machine bed. The stock passes from the tab receiving position between the die 72 and the cutter 75, and across the face of die 72, and along the vertical face of an elongated guide plate 78, fixed to the machine bed and spaced a short distance from the inner face of the block 39, to form a narrow passage for the disk stock. The cutter 75 works through an opening in plate 78, and is guided thereby and is normally, or when at its return stroke limit, withdrawn outwardly beyond the plane of the inner surface of said plate 78.

After each feed movement of the disk stock and while the stock is held at rest, the stapling and tab applying mechanisms apply a tab to the portion of the disk stock at the tab receiving position, and the cutter 75, moves forward and cuts out a disk from the portion of stock at the disk cutting position and the disk thus cut has the tab properly arranged thereon, and is forced by the cutter into the die 72, so that the outwardly forced succeeding disks, feed the column of disks forwardly through the passage 73, and into the discharge chute 74.

Fig. 11, shows disk stock portions at the tab receiving and disk cutting positions with the moving parts at the limits of their return strokes, having just applied a tab and cut out a disk, the stock being ready to make a feed stroke or movement to carry its portion having the tab to the disk cutting position with the tab opposite the vertical diametrical line of the cutter. Fig. 12, shows the position of the stock after having made such feeding movement, the cutter being shown on its cutting stroke, and the stapling mechanism being shown with the clencher on its operative stroke. The disk stock waste passes beyond the disk cutting position, and along the plate or wall 78, to the end of the machine bed where it can drop into a suitable discharge or offtake, or any suitable means can be provided to dispose of the same.

80, is a presser foot working through an opening in guide plate or wall 78, in rear of the cutter head 75, to hold and press the disk stock against the block 39, and the die 72, during the disk cutting operation and until the cutter has withdrawn from the stock. In Fig. 12, the presser foot is shown in operative position holding the stock. Suitable means can be provided for controlling and actuating said presser foot. For instance, I show said foot carried by the free end of a spring plate 81, arranged longitudinally at the outer side of wall 78, and secured thereto, and constantly tending to spring away from said wall and withdraw the foot from operative position. After the completion of a feeding movement of the stock, a projection, such as roller 82, carried by a suitable moving part of the machine, such as the wire feed, moves along the spring plate 81, and bends the same to throw the presser foot to operative position against the disk stock.

Suitable means can be provided to supply staple wire to the staple forming mechanism, although within the broad features of my invention any mechanism can be provided to clip or otherwise secure any form of handle to the disks. In the specific example illustrated, I show a reciprocating wire feed device to feed at each operative stroke, a certain length of wire drawn from a spool or other source of supply, through the wire guide tube 60 into the stapling mechanism. The reciprocating wire feeder comprises a reciprocating slide 83, confined to slide on the top face of a block 84, secured on and rising from the top face of the machine bed. On the top face of slide 83, I arrange a pair of wire gripping jaws 85, 86 formed by a pair of horizontal metal plates resting on the top face of the slide. The jaw 85, is fixed on the slide and its longitudinal wire receiving edge is usually longitudinally grooved to partially receive the wire. The jaw 86 is movable toward and from the fixed jaw and is usually, near one end, mounted to swing on a pivot 87, and is held down and guided by the head of set screw 88, passed through a transverse slot in said jaw (Fig. 8). The movable jaw is adapted to swing to the fixed jaw to tightly grip the wire between the longitudinal wire engaging edges of the jaws and thereby carry the wire forward during the feed stroke of the slide, and to swing away from the fixed jaw and thereby permit said jaws to move rearwardly along and independently of the wire, during the return stroke of said slide.

The movable jaw is forced to and relieved from wire gripping position, by the lever 89, through which the slide is reciprocated. This lever 89, is horizontally disposed on the slide top and projects laterally therefrom and between it...... is confined and fulcrumed thereto by vertical pivot 90. The free end of the lever terminates adjacent to the outer edge of the movable jaw 86, and is provided with a projecting toe 91, arranged to engage said jaw and press and hold the same to wire gripping position when the link 92, pivoted to the outer end of lever 89, is pushed forward to move the slide on feed stroke. When the link 92 is pulled in the opposite direction, to move the slide on its return stroke, the lever 89, is rocked to engage the stop formed by set screw 93, and the free end of the lever swings clear of the movable jaw permitting the same to swing out from operative or gripping position whereby the jaws do not move the wire during the return stroke of the slide. On the feed stroke, the lever 89, is pressed forward against stop 94, carried by the slide. The length of the wire feeding stroke can be varied or regulated by adjusting the screw 93 to permit a greater or less amount of loss or independent swing of the lever 89, on the slide. The wire passes to the gripping jaws through guide tube 95, carried by the slide, and passes from said jaws through the guide eye 96, fixed to the front end of the slide, and from which the straight length of wire passes over the disk cutter housing 77, into the inlet end of the guide tube 60 which leads into the stapling mechanism.

A suitable wire tension and straightening device can be provided preferably interposed between the source of wire supply and the wire feeding device. I show such a device located on the machine bed beyond and through which the wire feeder draws the wire. This device consists of a vertically disposed block 97, rigidly secured on the bed, and formed with a horizontal socket, recess or rabbeted portion extending therethrough. A fixed jaw 98, is secured in this socket and this jaw has a longitudinal top edge longitudinally grooved for the passage of the wire, the groove being shallow so as not to entirely receive the wire. 99, is the upper movable and yieldingly held jaw parallel with and normally held yieldingly down on the fixed jaw to hold the wire against retrograde movement between the jaws and to exert a tension on the wire and yet permit longitudinal forward movement thereof when sufficient pull is exerted thereon to overcome the tension of the movable jaw. The under surface 100, of the top wall of the recess is inclined downwardly and rearwardly and the corresponding upper longitudinal edge 101 of the movable jaw is likewise inclined, and a series of anti-friction balls 102, is interposed between and in contact with said inclined faces. The rear end of the movable jaw is provided with a stop or lip 103, to confine the balls in place. A spring 104, secured to the plate or block 97, presses against the front end of the movable jaw and constantly tends to press said jaw longitudinally and rearwardly under which action the inclined surfaces tend to force the movable jaw down exerting tension on or gripping the wire and holding the same against retrograde movement, while permitting the wire to be moved forwardly, as will be obvious to those skilled in the art.

Suitable means are provided to drive the various working parts in proper sequence. For this purpose, I show a main drive shaft 105, arranged horizontally along one longitudinal edge of the machine bed and carried by journal boxes 106, secured to and projecting laterally from said bed. At its outer end I show this shaft provided with drive wheel or pulley 107, and at its opposite end said shaft is connected to drive shaft 71, through the medium of bevel gearing 108. The shaft 71 is arranged parallel with an end of the bed and is carried by journal boxes 109 projecting from said end of the bed. The shafts 105 and 71 are constantly rotated in one direction during the operation of the machine. Shaft 71, through the medium of disk 69 periodically actuates the staple clencher on its clenching stroke as hereinbefore described, and also through the medium of gear 110, rigid on the shaft and meshing with gear 13, said shaft continuously actuates the disk stock feeding device, and also through the medium of bevel gear 111, rigid on the shaft and meshing with bevel gear 51, on shaft 50, said shaft 71, continuously actuates the handle or tab stock feeding device. The shaft 105, is usually arranged parallel with the line of feed of the disk stock and below or about flush with the horizontal plane of the top face of the bed. This shaft constitutes a cam shaft for the actuation of the stapling mechanism, disk cutter, and wire feeder. 112, is a continuous cam groove encircling said shaft and formed therein or in a sleeve thereon for actuating the wire feed, through the medium of a horizontally disposed lever 113, fulcrumed between its ends, at 114, on the bed and at one end pivoted to the end of link 92, and at its opposite end extending over said cam and having a depending stud 115, confined in said cam groove, whereby lever 113, is rocked to properly actuate the wire feeder by the engagement of the cam surfaces with stud 115.

116, is an encircling cam around shaft 105 formed by a cam groove in the shaft or a sleeve secured thereon for periodically actuating the disk cutter, through the medium of an elbow lever 117, fulcrumed at its apex to the bed by vertical pin 118 and having one arm pivotally joined to the end of the disk cutter stock 76, and its opposite arm extending horizontally over the cam and provided with a depending stud 119, confined in said cam groove 116, whereby the cam edges of said groove through the medium of said stud, swing said lever to reciprocate the cutter in proper sequence with other working parts of the machine. An encircling cam or groove 120, is provided around the shaft or in a sleeve thereon to actuate the staple driving hammer, through the medium of horizontal elbow lever 121, at its apex fulcrumed to the bed on vertical pin 122, and having its lateral arm pivotally joined to the end of the hammer slide 52, and its outer end overhanging the cam and provided with a depending stud 123, confined in said cam groove 120. An encircling cam or groove 124 is provided in the shaft or a sleeve thereon to actuate the staple forming slide through the medium of horizontally disposed elbow lever 125, fulcrumed at its apex at 126, to the bed and at the end of its outer arm having depending stud 127, confined in said cam groove 124, while the opposite end of the lever is pivotally joined to the staple forming slide 41, by link 128, to reciprocate said slide as lever 125, is rocked by its stud following the rotating cam edge.

The driving gear or connections are usually so arranged that at each complete revolution of shafts 105 and 71, the printing and disk stock feed rolls, and the tab stock feed rolls will all and practically together perform feeding movement, and the tab attaching and disk cutting and wire feeding devices will all perform their operative strokes and return to their normal positions, the stock feeding devices performing their strokes and leaving the tab stock and disk stock at rest while the tab attaching, disk cutting and wire feeding operations are being performed.

The stapling and disk cutting mechanisms might be duplicated to act on a wider ribbon of disk stock and simultaneously attach two tabs and cut out two disks; and in fact the stapling mechanism and tab stock feed might act in connection with separate pieces of sheet material such as previously cut disks to apply tabs thereto; and within the broad features of my invention, the tab attaching mechanism might be adapted to secure the tabs by other means than staples, and various variations, rearrangements and modifications might be resorted to, and elements might be added and elements omitted, without departing from the spirit and scope of my invention, and hence I do not wish to limit myself to the exact constructions and arrangements shown.

Having thus described my invention, what I claim and desire to secure by Letters Patent of the United States is:—

1. A machine for making closing disks having free end handles secured on and overlying the upper faces thereof, comprising disk stock feeding means, mechanisms for securing the end portions of lengths of tab stock to the edge portion of the outer face of the disk stock to form free end handles arranged on and transversely overlying said face of the disk stock, and means for cutting disks from said stock with handles extending inwardly on the top faces thereof.

2. A machine for making closing disks from sheet material disk stock, comprising means for stapling tabs or handles to said stock, and means for cutting the disks flush with the outer ends of the tabs from the portions of the stock to which said tabs have been secured.

3. A machine for making closing disks, comprising means for feeding disk stock step by step, means for feeding tab stock step by step and transversely of the line of feed of the disk stock, means for cutting the tab stock and clipping the same to the disk stock, and means for cutting the disks from said disk stock.

4. A machine for making closing disks having attached handles on the top faces thereof, comprising means for securing handles at spaced intervals to a side face of a length of disk stock, and mechanisms for thereafter cutting out disks from said stock having handles within the edges thereof and arranged on and overlying the top faces thereof.

5. A machine for making closing disks having attached handles, comprising means for feeding disk sheet material, mechanisms for presenting separate lengths of tab stock to a side face of said sheet material and for separately securing said lengths thereto to form handles and means for punching disks from said sheet material each having a handle overlying one face thereof and not projecting beyond the edge thereof.

6. A machine for making closing disks having attached handles, comprising a die with a discharge opening therethrough for the disks, means to guide the disk stock waste from said die, means for feeding a ribbon of disk stock to said die, means for applying handles thereto, and means coöperating with said die for punching disks from said stock and into said discharge opening.

7. A machine for making closing disks having attached handles, comprising a guide bed having a disk discharge opening therethrough, means for feeding a ribbon of disk stock along said bed and past said opening, handle applying means, and a punch for cutting disks from said stock and discharging the same through said opening.

8. A machine for making closing disks, comprising a guide bed having a discharge opening extending transversely therethrough, a step-by-step feeding device for moving a ribbon of disk stock along said bed and flat face thereto past said opening and for moving the waste therefrom, handle applying means and a disk-cutter operating in sequence with said feeding device to cut disks from said stock and discharge the same through said opening.

9. In combination, means for feeding a ribbon of disk stock, means for feeding a band of tab stock transversely of a face of the disk stock, means for securing the ends of lengths of said tab stock to said disk stock at uniformly spaced intervals, and means for cutting out from said disk stock the portions having said tabs to form disks having handles.

10. In combination, means for feeding sheet material step by step, means for feeding tab stock transversely across the line of feed of said material, and means for severing and stapling lengths of said tab stock to said material after each feeding movement thereof.

11. In a machine for making closing disks having free end handles, in combination, means for stapling separate sheet material handles, each at one end, to and at stated intervals along a side face of a ribbon of disk stock, and mechanism for then so cutting out the portions of said stock having the handles attached thereto as to produce disks having free end handles overlying the outer faces thereof and attached to the edge portions thereof.

12. In combination, mechanism for feeding sheet material step by step, to handle securing mechanism and from said mechanism to disk punching means, mechanism for securing handles to said material and means for then punching closing disks having handles on their outer faces from said sheet material in alternating sequence with said feeding movements.

13. In combination, a sheet stock step by step feeder, stock printing mechanism acting on the stock simultaneously with said feeder, a tab stock step by step feeder, mechanisms for cutting off lengths of tab stock and stapling the same to said sheet stock in alternating sequence with the feeding movements of said stock, and cutting mechanism for cutting disks from said sheet stock after the tabs have been stapled thereto.

14. In a machine for making cover disks having handles, the combination of a guide bed, means for feeding a ribbon of disk stock longitudinally along and flat face to said bed, means opposite said bed for securing separate handles to and at intervals along a flat face of said stock, and means for cutting disks having handles from said stock and discharging the same transversely through said bed, said bed having a transverse disk discharge opening therethrough, said bed guiding the stock waste longitudinally thereof and from said disk cutting means.

15. In a machine for making cover disks, in combination, a frame, a guide bed having an intermediate disk discharge opening extending transversely therethrough, a reciprocating disk cutter opposite said bed and operative toward and from the same to cut disks from disk stock and discharge the same transversely of the bed and through said opening, means for securing sheet material to and at intervals along and overlying disk stock, a disk stock tension device, and a disk stock feeding device arranged between said tension device and said means and adapted to draw a ribbon of disk through said tension device and push the same longitudinally along said bed to and past said means and to said opening.

16. In a machine for making cover disks, in combination, a frame, a guide bed having a disk discharge opening extending transversely therethrough, a disk cutter opposite said bed for cutting disks from disk stock and discharging the same through said openings, a disk stock tension device, handle applying means, and a pair of constantly rotating cooperating feed rolls having an interrupted feeding surface and adapted to draw a ribbon of disk stock through said tension device and push the same longitudinally along said bed and past said means and to said opening.

17. In a machine for making cover disks, in combination, a guide surface for disk stock, disk stock feeding means, means for applying handles to the disk stock, means for cutting disks from a ribbon of disk stock and for discharging the disks transversely therefrom, and guiding means beyond said cutting means for guiding the stock waste therefrom, substantially in the line of feed of the disk stock.

18. In a machine for making cover disks, the combination of a guide bed having an intermediate disk discharge opening extending transversely therethrough, means for feeding a ribbon of disk stock longitudinally along said bed and across said opening, means for presenting handles at intervals to and overlying a flat face of said stock, means for separately securing said handles to said stock, and means for cutting disks from said stock and discharging the same through said opening, substantially as described.

19. In a machine for making cover disks, the combination, of a guide bed having an intermediate disk discharge opening extending transversely therethrough, a disk cutter operative toward and from said opening, means for feeding a ribbon of disk stock along said bed, means for feeding handle stock to and overlying successive portions of a flat face of said disk stock along said bed, and stapling mechanism operative transversely of said bed for stapling handles to successive portions of a flat face of said disk stock before the same is moved to said opening.

20. In a machine for making cover disks, in combination, guiding means for a ribbon of disk stock comprising a guide bed, means for periodically feeding a ribbon of disk stock along said guiding means, means for periodically presenting handle stock lengths to and transversely overlying a flat face of said disk stock along said bed, staple driving means movable toward said bed for driving staples through said handle and disk stock, a staple clencher movable through said bed, and means for cutting disks each having a handle overlying and stapled on a flat face thereof.

21. In a machine for making cover disks, the combination of a frame, stapling mechanism, disk cutting mechanism, means for guiding a ribbon of disk stock to the stapling mechanism and from the stapling mechanism to the disk-cutting mechanism and for guiding the disk stock waste from the cutting mechanism, means for guiding the disks from the cutting mechanism, means for presenting handle stock at the stapling mechanism and overlying a flat face of the disk stock, and disk stock feeding means.

22. In combination, means to imprint spaced portions of a band of sheet disk stock, mechanism for securing pull tabs to said portions, and mechanism for cutting said portions from the stock, thereby producing closing or cover disks each imprinted and having a pull tab secured thereto.

23. In combination, actuating and feeding devices, mechanism for securing pull tabs to and at spaced intervals on a band of disk stock, and mechanism for cutting out the spaced portions of said stock to which said tabs are secured to form cover disks, each having a pull tab secured thereto.

24. In combination, a bed, means to feed a ribbon of disk stock across said bed, means to feed a band of tab stock transversely of said disk stock, stapling forming, driving and clenching mechanism for stapling tabs to said disk stock at stated intervals thereon, means for severing tabs from said tab stock, and a cutter for cutting disks at stated intervals from said disk stock.

25. In a machine for making cover disks, the combination of a printing mechanism comprising a pair of constantly rotating coöperating rolls, one of said rolls having an interrupted disk stock engaging and printing surface, means to feed a ribbon of disk stock to said rolls for imprinting uniformly spaced intervals thereof, mechanism adapted to apply handles to said imprinted portions, means for guiding said stock beyond said rolls comprising a guide bed having a transverse disk discharge opening therethrough, means for cutting out said uniformly spaced imprinted portions of said stock to form disks and discharging said disks through said opening, and operating connections timed to operate said parts in sequence.

26. In a machine for making cover disks, the combination of disk stock guiding means, step by step disk stock feeding means, disk stock printing means adapted to imprint uniformly spaced portions of the disk stock and comprising constantly rotating coöperating rolls between which said stock passes, one of said rolls having an interrupted printing surface acting on the stock simultaneously with the stock feeding movement of said feeding means, mechanism adapted to apply handles to said imprinted portions, disk stock cutting means cutting out said uniformly spaced imprinted portions of said stock to form disks, and actuating connections timing said cutting means to cut out said disks during the intervals between said simultaneous printing and feeding movements.

27. In combination, a bed having a wall, means for moving a ribbon of disk stock along said wall, means for feeding tab stock across said disk stock behind said wall, means for cutting off tabs from said tab stock, means for driving staples through the tabs and disk stock, means movable through said wall for clenching said staples, and means for cutting disks from the disk stock, said wall provided with a discharge opening for the discharge movement of said disks.

28. In a machine for making cover disks, in combination, a bed, means for moving a ribbon of disk stock in a straight line along the bed, means for feeding tab stock to and overlying a flat face of the disk stock, tab stapling mechanism movable transversely of the line of feed of the disk stock for stapling handles at uniform intervals on and overlying the disk stock, and cutting mechanism movable transversely of said line of feed for cutting disks having exposed handles from said disk stock.

29. In combination, a horizontally disposed bed, means for moving and guiding a ribbon of disk stock across said bed, mechanism for stapling separate handles flat against the side face of and at stated intervals along said stock, and means for punching disks having handles from said stock.

30. In a machine for making cover disks, a bed, means for moving a ribbon of disk stock along the bed, means for feeding a band of handle tab stock transversely of the bed and across a face of the disk stock, mechanisms for cutting handles from said tab stock and stapling them to the disk stock, and means for cutting disks having handles from the disk stock.

31. In a machine for making cover disks, in combination, a bed, means for guiding sheet stock on the bed, means for feeding tab stock transversely of the bed and across said sheet stock, a knife edge across which said tab stock is fed, mechanism for stapling the tabs to said sheet stock comprising a reciprocating member coöperating with said knife edge to sever the tabs from said tab stock.

32. In a machine for making cover disks, in combination, a bed, means for feeding a ribbon of disk stock along the bed, means for feeding a band of tab stock through the bed and across the face of the disk stock, means for cutting off tabs from said tab stock, mechanism for stapling the tabs to the disk stock, and means movable above the bed for cutting disks from the disk stock.

33. A machine for making cover disks, comprising in combination, a bed, disk stock feeding means, disk cutting means, means for supplying tabs at the face of said stock, means for periodically holding the disk stock stationary and means for stapling the tabs to said stock comprising a wire cutting and staple bending slide, a former, means for withdrawing the former from the path of the slide when the staple is formed, a reciprocating staple guiding hammer, and a reciprocating staple clencher.

34. A machine of the character substantially as described, comprising in combination, means for guiding sheet material, means for supplying tab stock to the face of said material, means for cutting tabs and mechanism for stapling the tabs to said material and cutting off the tabs comprising a reciprocating tab and wire cutting and staple forming slide having a staple forming socket, a former to coöperate with said socket in forming the staples, a movable carrier for said former, means whereby said carrier is moved by said slide to withdraw the former, a staple driving hammer movable in said slide, and means for clenching the staple.

35. In combination, means for guiding sheet material, a die arranged on one side of the sheet material path, means for supplying tab stock at the other side of the sheet material path, tab cutting means, stapling mechanism for stapling the tabs to said material comprising staple forming and driving devices, a clenching tool movable through said die, and a wire feed for feeding wire into said staple forming mechanism.

36. A machine for making cover disks in combination, a bed, a wall thereon, means for feeding a ribbon of disk stock along said wall, means for feeding tab stock transversely of the disk stock and wall, means for cutting tabs from the tab stock, stapling mechanism for stapling the tabs to the disk stock comprising a reciprocating clenching tool movable through said wall, means for reciprocating said tool in sequence with the stapling mechanism, and disk cutting means.

37. In a machine for making cover disks, in combination, a bed, means for feeding a ribbon of disk stock along the same, means for feeding a band of tab stock upwardly through the bed beside and transversely of the disk stock comprising a pair of constantly rotating rolls beneath the bed having interrupted feeding means, means above the bed for severing tabs from the tab stock, means above the bed for securing the tabs to the disk stock, and means above the bed for cutting disks from the disk stock.

38. A machine for forming cover disks comprising a bed having a wall thereon provided with an annular die and a discharge opening from the die, means for feeding disk stock across said die, means for securing tabs to and at stated intervals along the disk stock, and a reciprocating cutter coöperating with said die to cut disks from the stock and discharge the same through said die.

39. In a machine for forming cover disks, in combination, tab applying means, a bed provided with an annular die having a discharge opening therethrough, means for feeding disk stock by a step by step movement across said die, means for holding said stock to said die, a movable member for periodically applying and releasing said holding means, and a reciprocating cutter coöperating with said die in cutting disks from said stock.

40. In a machine for making cover disks, in combination, a tab applying means, a bed, walls thereon forming a disk stock guideway, one of said walls having a discharge opening therethrough, a reciprocating disk cutter movable through the opposite wall and into said opening, a normally withdrawn pressure foot movable through said last mentioned wall, a movable member adapted to periodically force said pressure foot through said wall to press the disk stock to the opposite wall, means for feeding disk stock step by step between said walls, and actuating mechanism timed to actuate said movable parts in proper sequence.

41. In a machine for making cover disks, in combination, a bed, means for feeding a ribbon of disk stock along the same, means for securing separate handles on to the disk stock comprising staple forming, driving and clenching mechanism, means for feeding staple wire to said mechanism comprising a reciprocatory slide having fixed and movable wire gripping jaws and actuating means for said slide comprising a lever engaging the movable jaw to grip the wire on the feeding stroke, and releasing said jaw on the return stroke of said lever, and disk cutting mechanism.

42. In a machine for making cover disks, in combination, a bed, vertically disposed stock feed rolls arranged above the bed, disk stock printing mechanism, comprising a pair of vertical rolls above the bed, means for cutting disks from the disk stock, a shaft carried by the bed, and gearing beneath the bed for positively rotating all of said rolls, said gearing being geared to and actuated by said shaft.

43. In a machine for making cover disks, in combination, a bed, means for feeding disk stock along the same, means for attaching separate handles to said stock comprising stapling mechanism including a reciprocating staple forming slide and a reciprocating staple hammer, a reciprocating disk cutter, a cam shaft, and actuating connections between said cam shaft and said slide, hammer and cutter.

44. In combination a bed, means for feeding disk stock along the same, means for securing separate handles to said stock comprising staple forming and driving mechanism, a wire feed for supplying wire to said mechanism, a reciprocating disk cutter, a shaft carried by said bed and having a series of cam grooves, and a series of levers actuated by said cam grooves and connected to actuate said wire feed, said disk cutter, and said stapling mechanism.

45. In combination, a bed, disk stock feed rolls thereon, feed rolls carried by the bed for feeding tab stock across the disk stock, stapling mechanism comprising staple forming and driving slides for securing the tabs to the disk stock, a clenching tool for clenching the staples, a reciprocating disk cutter, a reciprocating wire feed for supplying wire to the stapling mechanism, a cam shaft carried by said bed, a counter shaft carried by said bed and driven by the cam shaft, driving and actuating connections between the counter shaft and said disk stock feed, tab stock feed and clenching tool, said cam shaft being provided with a series of cams, and actuating levers carried by said bed and actuated by said cams to reciprocate said stapling mechanism slides, the cutter, and the wire feed.

46. In combination, means for feeding a ribbon of disk stock step by step, means for feeding a flat ribbon of handle tab stock step by step and intercepting the line of feed of the disk stock, periodically moving means for cutting off handle tabs and securing the same to the disk stock at regularly spaced intervals thereon, and means for cutting out disks each with a handle tab secured thereto and cut off flush with the edge of the disk.

47. In combination, means for feeding a ribbon of disk stock, means for clipping separate handle tabs at regularly spaced intervals to and overlying a side face of said disk stock, and means for cutting disks from said stock, each having a handle tab lying and exposed on the top face thereof.

48. In a machine for making cover disks, the combination of mechanism for periodically presenting separate handle tabs to and overlying a side face of disk stock, means for securing said tabs to the stock to form separate handles overlying the stock, and means for then cutting out the areas of said stock having said separate handles secured to the edge portions thereof and extending inwardly therefrom to form disks having said handles on the top faces thereof.

49. In a machine for making cover disks, the combination of mechanism for securing handles to and overlying disk stock, and means for simultaneously trimming said handles and cutting disks from said stock each having a handle on the top face thereof.

50. In a machine for making cover disks, the combination of means for presenting handles at a flat face of disk stock, mechanism for securing the handles to the edge portions and arranged diametrically of the areas of the stock to be cut out to form disks, and mechanism for cutting out said areas to form disks having inwardly extending handles overlying their outer faces.

51. In a machine for making cover disks, the combination of stapling mechanism for securing lengths of handle stock, at uniform intervals along a ribbon of disk stock, disk stock feeding mechanism, and an annular cutter for cutting from said stock disks having handles overlying their top faces and arranged within the edges thereof.

52. In a machine for making cover disks, the combination of a step by step disk stock feeder, means for securing handles to and at intervals along and overlying the areas of said stock to be cut out to form disks, and an annular cutter adapted to cut out said areas of the stock to form disks having handles on their top faces.

53. In a machine for making cover disks, the combination of means for presenting separate flat handle tabs to and overlying sheet material to form disks, means for stapling said handles to and down on said material, and an annular cutter for trimming said handles to not project beyond the edges of the disks.

54. In a machine for making cover disks, the combination of means for feeding a ribbon of disk stock, means for feeding a ribbon of sheet handle stock to and overlying a face of the disk stock, means for cutting handles from said stock in length less than the diameter of the disks, means for stapling one end of each handle down on the edge portion of an area of said disk stock to be cut out to form a disk having the free end of the handle overlying an intermediate portion of said area, and mechanism for cutting out said areas to form disks having handles overlying their upper faces.

55. In combination, means for intermittently feeding a ribbon of disk stock, means for simultaneously and intermittently feeding a ribbon of handle stock to a face of the disk stock, and intermittently and simultaneously acting mechanisms for cutting handles from said handle stock and for stapling the same to the disk stock and for cutting disks having handles from the disk stock.

56. In combination, disk stock feeding means, means to present separate handles to and overlying an outer face of said stock at spaced intervals along the same, stapling mechanism for securing said handles to and flat against said stock, and means for then cutting disks having said handles from said stock.

57. In combination, handle applying mechanism for stapling handles to a side face of disk stock, disk cutting mechanism, and a step by step disk-stock feeding device for moving a ribbon of disk stock through said mechanisms, said device adapted at each feeding motion to present a side face area of the stock to said handle applying mechanism and to remove the portion having received a handle to the disk cutting mechanism.

58. In combination, disk stock printing mechanism, handle applying mechanism for securing handles to side face areas of disk stock, disk cutting mechanism, and a step by step feeding device for moving a ribbon of sheet disk stock forwardly through said mechanisms, said mechanisms and device being so arranged that at each feeding stroke of the stock, an imprinted side face area will be presented at the handle receiving position, and the area having received a handle will be presented at the disk cutting position.

59. In combination, a frame, a drive shaft carried thereby, constantly rotating intermittent disk stock feeding means, constantly rotating intermittent handle stock feeding means, constantly rotating disk stock printing means, actuating connections from said shaft to said means, a reciprocating wire feeder, actuating connections between the same and said shaft, reciprocating staple forming and driving means for securing the handles to the disk stock, actuating connections between the same and said shaft, a reciprocating cutter for punching the disks from the disk stock, and actuating connections between the same and said shaft.

60. In a machine for making cover disks or the like, in combination, a frame, a drive shaft carried thereby, disk stock feeding means actuated therefrom, a wire feed mechanism, a lever for actuating the same, a cam on said shaft for rocking said lever, mechanism for applying handles to said disk stock comprising reciprocating staple forming and driving means, levers for actuating the same, cams on said shaft for actuating said levers in proper sequence, a reciprocating cutter for punching disks from said stock, a lever for reciprocating the same, and a cam on said shaft for reciprocating said last mentioned lever.

61. In a machine for making cover disks or the like, in combination, a frame, a drive shaft carried thereby, a driven shaft carried by said frame and connected with and driven by said drive shaft, constantly rotating disk stock and handle stock feeding means geared to and driven by said driven shaft, reciprocating staple forming and driving and handle stock cutting means, actuating connections between the same and said drive shaft, a wire feeder, actuating connections between the same and said drive shaft, a reciprocating cutter for punching disks from the disk stock, and actuating connections between the same and said drive shaft.

In testimony whereof I affix my signature, in presence of two witnesses.

FRANK L. NICHOLS.

Witnesses:
P. H. MOORE,
HUBERT E. PECK.